United States Patent

Bianchini

[11] 4,034,624
[45] July 12, 1977

[54] VALVE ACTUATING DEVICE

[75] Inventor: Pierluigi Bianchini, Florence, Italy

[73] Assignee: Nuovo Pignone, S.p.A., Florence, Italy

[21] Appl. No.: 670,727

[22] Filed: Mar. 26, 1976

[30] Foreign Application Priority Data

Mar. 27, 1975 Italy ............................. 21725/75

[51] Int. Cl.² ........................................ F16D 21/06
[52] U.S. Cl. ........................ 74/625; 192/48.91;
192/93 A; 192/95
[58] Field of Search ............ 192/48.91, 93 A, 95;
74/625

[56] References Cited

U.S. PATENT DOCUMENTS

| 812,817 | 2/1906 | Bryan | 192/95 X |
|---|---|---|---|
| 3,515,250 | 6/1970 | Cantalupo | 192/48.91 |
| 3,603,175 | 9/1971 | Horton | 192/48.91 X |
| 3,740,146 | 6/1973 | Wilharm | 192/95 X |

*Primary Examiner*—Allan D. Herrmann
*Attorney, Agent, or Firm*—Ralph M. Watson

[57] ABSTRACT

In a valve-actuating mechanism of the kind which is manually manipulated for actuating the valve-actuating member, the combination of a helical cam surface formed on a friction ring, a follower solid with the handwheel shaft and two confronting cylindrical surfaces carrying clutching dogs, a spring being inserted therebetween. Frictional forces are exploited for causing the axial displacement of the handwheel overcoming the spring bias.

1 Claim, 3 Drawing Figures

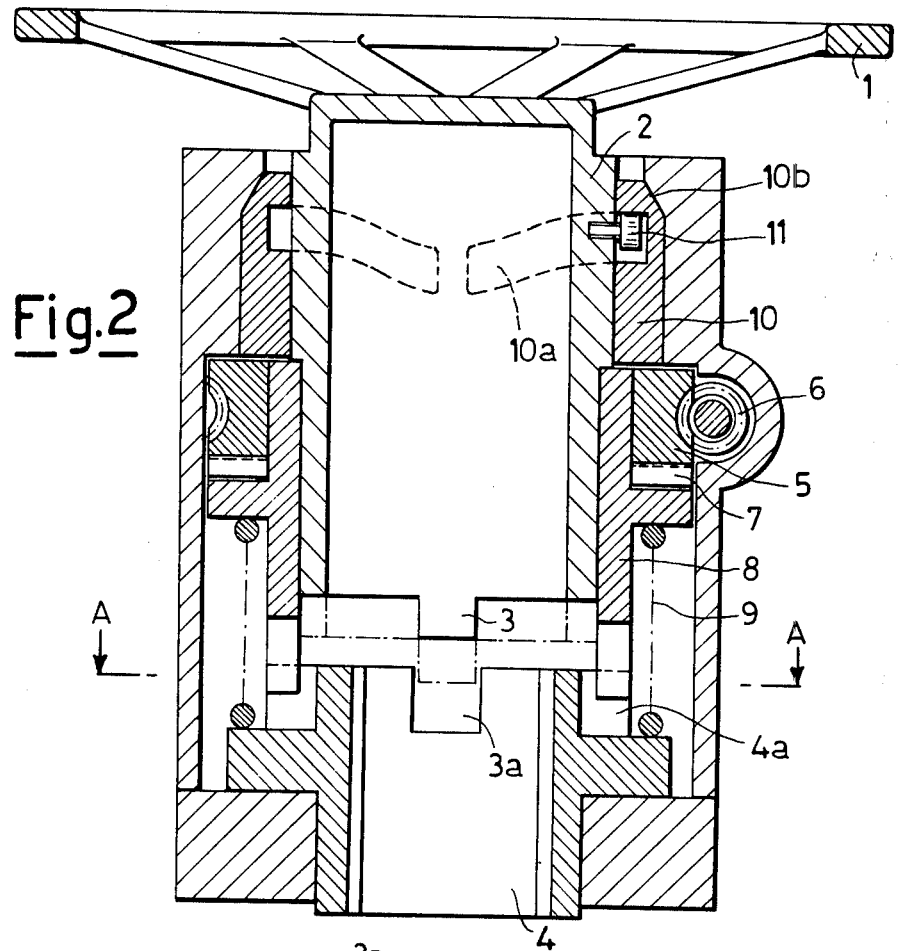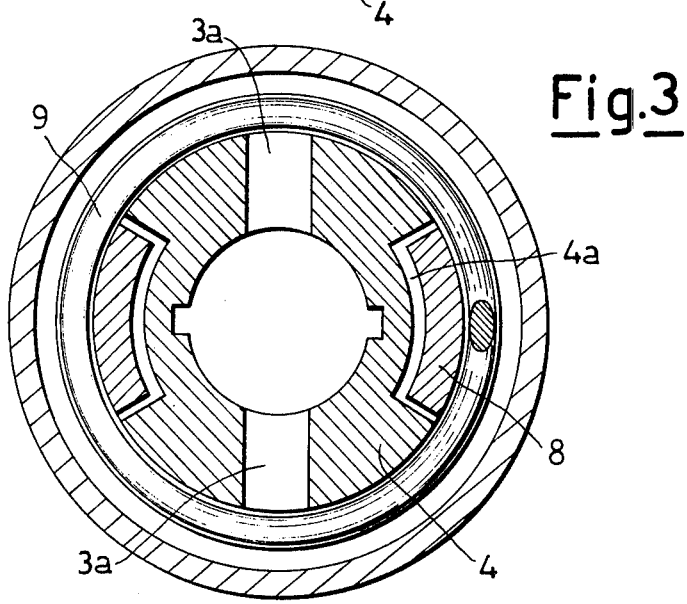

VALVE ACTUATING DEVICE

This invention relates to a valve actuating device for automatically clutching of a handwheel to a valve actuator and for the manual actuation of the valve by merely rotating the handwheel manually without further manipulations or other control members.

In the conventional art clutching does not take place automatically. Rather a special device is provided which is either manually or electrically actuated.

FIG. 1 shows the operation of a manually-controlled clutch on the actuators as available at present in the trade. The helical wheel A and the handwheel B are idly mounted on the central column C, and the bushing D draws the column 2 by means of the key E.

In the normal motorized operation the helical wheel A by means of the bushing D which is clear of the handwheel arbor and is inserted in the seatings F of the wheel, actuates the central column C thus effecting the opening or the closure of the valve.

Whenever a manual operation is required, the operator shall bring the lever G on the "manual" position thus acting upon the cam N which clears the bushing D from the helical wheel A and clutches it to the handwheel I.

The objects of the present invention are:
to simplify the manipulation to be effected by the operator for manual actuation;
to simplify mechanical construction.

In the drawings:

FIG. 2 is a vertical cross sectional view of the device of the present invention.

FIG. 3 is a cross sectional view of the device shown in FIG. 2, taken along the lines A—A.

Figure 1:
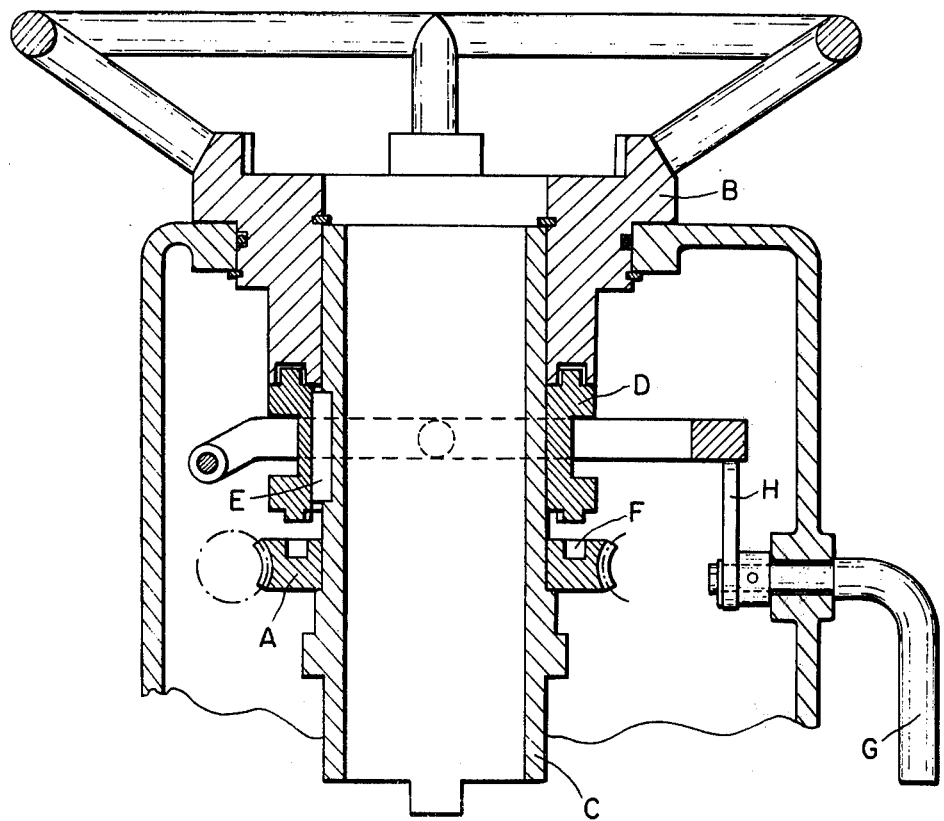

Referring to the drawings there is shown:

A handwheel 1 for manual actuation, which is integral with a cylinder 2 which carries at its bottom end teeth 3 adapted to enter as many recesses 3a of a drag bushing 4.

A crenellated wheel 5 which is in constant mesh with the worm 6, the latter, in turn, being integral with the shaft of the electric motor. This wheel 5 carries teeth, such as teeth 7, which normally mesh with as many recesses in a cylinder 8, so as to drive the latter to rotation.

The cylinder 8 which is normally in mesh with the crenellated wheel 5, under the bias of a spring 9, so as to connect the latter with the drag bush 4. By overcoming the bias of the spring 9, this cylinder 8 can be thrust axially downward and becomes clear of the wheel 5 so that the latter becomes idle.

The drag bush 4 which, in the illustrative embodiment is a valve actuating member, is always in mesh with the cylinder 8 by means of teeth 4a, but also can be in mesh with the cylinder 2 via a mechanical clutch, such as teeth 3 and recesses 3a.

A friction ring 10 which, with a helical groove 10a in which a follower 11 affixed to the cylinder 2 is engaged, moves the handwheel downward when the later is rotated.

The stress of the downward displacement of the handwheel must be such as to overcome the bias of the spring 9, so as to clear the cylinder 8 of the gear 5 and to engage the cylinder 2 with the bushing 4 or valve actuating member.

The axial stress is caused by the groove 10a and by the frictional resistant force as supplied by a conical surface 10b which prevents a free rotation of the ring 10.

The automatic clutching of the handwheel, as well as the unclutching of the motor, takes place in the following manner for both directions of rotation.

As soon as the operator manipulates the handwheel 1, the latter is automatically thrust towards the bushing 4 by the follower 11 which slides within the helical groover 10a of the ring 10. Two situations may take place, namely: at the end of the stroke of the follower 11 in the groove 10a, that is after a quarter of a revolution of the handwheel, the tooth 3 exactly enters its seating 3a and, if so, the cylinder 2 is made solid with the bushing 4. As an alternative, the tooth 3 comes into contact with the top surface of the bushing 4 before the end of stroke of the follower 11 without encountering the seat 3a. If this occurs rotation of the handwheel continues, and the ring 10 starts rotation with the tooth 3 sliding over the bushing 4 until it enters its seat 3a. Thus, in this case also, the cylinder 2 remains engaged with the bushing 4, which is driven directly by the handwheel.

The axial shift of the cylinder 2 initiates the unclutching of the cylinder 8 from the gear 5 and the latter remains idle on the cylinder 8 together with the motor.

By continuing the rotation of the handwheel 1 for manual manipulation of the actuator, after the automatic clutching, the friction ring 10 rotates with the handwheel as an entity. The friction imparted to the conical surface 10b brakes the rotation of the ring 10 to a degree which suffices to cause an axial shift of the handwheel and its attendant cylinder 8 against the bias of the spring 9.

The automatic unclutching of the handwheel and the clutching of the motor takes place identically for either direction of rotation as follows:

As soon as the operator releases the handwheel 1, the spring 9 determines an axial shift of the cylinders 8 and 2 in a direction which is opposite to the one as described for the automatic clutching.

Thus, while the cylinder 8 engages the gear 5 again, putting the latter in direct mesh with the bush 4, the cylinder 2 is cleared. When in the inoperative position, the follower 11 and the groove 10a force the handwheel 1 to be rotated in the reverse direction relative to the direction of rotation followed when carrying out the preceding manipulation.

What I claim is:

1. A valve actuating device for automatically clutching a handwheel to a valve actuator which manually opens and closes the valve, comprising:
a handwheel (1) for manual actuation of the valve,
a cylinder (2) integral with said handwheel (1) which has teeth (3) at its lower end,
a gear (5) about said cylinder (2) having teeth (7),
a worm (6) in constant mesh with said gear (5) having an integral drive shaft,
a cylinder (8) about said cylinder (2) which moves in response to vertical movement of said cylinder (8) and wherein said cylinder (8) includes recesses which normally are engaged by said teeth (7) of said gear (5) so as to be driven by said gear (5) and worm (6) for automatically clutching said handwheel (1) to the valve actuator,
a valve actuator member (4) including teeth (4a) which are in engagement with said recesses in said cylinder (8), and recesses (3a) for engagement by said teeth (3) of said cylinder (2), a spring (9) between said cylinder (8) and said member (4) which normally biases said cylinder (8) into meshing engagement with said gear (5) and which normally operatively connects said gear (5) to said member (4), a friction ring (10) about said cylinder (2) having a helical groove (10a) therein, and a follower (11) secured to said cylinder (2) and in said helical groove (10a) for moving said cylinder (2) in response to manipulation of said handwheel (1), wherein rotation of said handwheel (1) in one direction causes said follower (11) to move said cylinders (2) and (8) downwardly, whereupon said cylinder (8) is moved clear of said gear (5) by overcoming the biasing action of said spring (9), and said teeth (3) on said cylinder (2) are brought into engagement with said recesses (3a) in said valve actuating member (4) for opening the valve, and wherein rotation of said handwheel (1) in the opposite direction causes said follower (11) to move said cylinder (2) upwardly and, in turn, to cause said cylinder (8) to be moved upwardly by the biasing action of the spring (9), whereupon said recesses in said cylinder (8) are engaged by said teeth (7) of said gear (5) and said teeth (3) of said cylinder (2) are disengaged from said recesses (3a) in said member (4) for closing the valve.

* * * * *